US012812554B2

(12) United States Patent
Yoo

(10) Patent No.: US 12,812,554 B2
(45) Date of Patent: Nov. 24, 2026

(54) APPARATUS AND METHOD FOR CONTROLLING DOWNLINK TRANSMISSION POWER IN WIRELESS COMMUNICATION SYSTEM

(71) Applicant: Samsung Electronics Co., Ltd., Suwon-si (KR)

(72) Inventor: Hwasun Yoo, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 268 days.

(21) Appl. No.: 18/650,797

(22) Filed: Apr. 30, 2024

(65) Prior Publication Data

US 2024/0284342 A1 Aug. 22, 2024

Related U.S. Application Data

(63) Continuation of application No. PCT/KR2022/018712, filed on Nov. 24, 2022.

(30) Foreign Application Priority Data

Dec. 24, 2021 (KR) ........................ 10-2021-0187732
Feb. 10, 2022 (KR) ........................ 10-2022-0017623

(51) Int. Cl.
*H04W 52/24* (2009.01)
*H04B 1/38* (2015.01)
(Continued)

(52) U.S. Cl.
CPC ....... *H04W 52/241* (2013.01); *H04W 52/262* (2013.01); *H04W 52/36* (2013.01)

(58) Field of Classification Search
None
See application file for complete search history.

(56) References Cited

U.S. PATENT DOCUMENTS 7,257,423 B2 * 8/2007 Iochi .................... H04W 52/16 370/335
8,170,600 B2 5/2012 Song et al.
(Continued)

FOREIGN PATENT DOCUMENTS

JP 5799510 B2 10/2015
KR 10-2010-0103107 A 9/2010
(Continued)

OTHER PUBLICATIONS

WO 2009036221, Kim et al, Oscillator Signal Generation With Spur Mitigation in a Wireless Communication Device, Mar. 19, 2009, whole document.*

(Continued)

*Primary Examiner* — Tuan A Tran
(74) *Attorney, Agent, or Firm* — Jefferson IP Law, LLP

(57) ABSTRACT

The disclosure relates to a $5^{th}$ generation (5G) or pre-5G communication system for supporting a higher data transfer rate than a $4^{th}$ generation (4G) communication system such as Long Term Evolution (LTE). A method performed by a base station in a wireless communication system is provided. The method includes decreasing a size of a transport block for a data packet when a size of a downlink data packet is less than or equal to a size of a predetermined minimum allocation resource, determining a transmit signal scaling factor for decreasing transmit power of the data packet, and determining the transmit power of the data packet, based on the transmit signal scaling factor.

16 Claims, 7 Drawing Sheets

(51) Int. Cl.

| | |
|---|---|
| ***H04M 1/00*** | (2006.01) |
| ***H04W 52/26*** | (2009.01) |
| ***H04W 52/36*** | (2009.01) |

(56) References Cited

U.S. PATENT DOCUMENTS

| | | | | |
|---|---|---|---|---|
| 8,369,260 | B2 * | 2/2013 | Bergman | H04W 52/325 370/329 |
| 8,432,829 | B2 * | 4/2013 | Liu | H04W 52/50 370/252 |
| 8,711,977 | B2 * | 4/2014 | Scholand | H04L 1/0009 375/267 |
| 8,908,543 | B2 | 12/2014 | Kim et al. | |
| 8,989,309 | B2 * | 3/2015 | Scholand | H04L 1/0009 375/267 |
| 9,319,997 | B2 * | 4/2016 | Mohan | H04W 52/146 |
| 9,432,972 | B2 * | 8/2016 | Imamura | H04W 72/20 |
| 9,491,775 | B2 * | 11/2016 | Nagata | H04L 5/003 |
| 9,510,298 | B2 * | 11/2016 | Wu | H04L 5/0057 |
| 9,520,972 | B2 * | 12/2016 | Gorokhov | H04L 5/0048 |
| 9,584,296 | B2 * | 2/2017 | Terry | H04L 1/1848 |
| 9,622,184 | B2 * | 4/2017 | Majjigi | H04W 52/12 |
| 9,693,281 | B2 * | 6/2017 | Chockalingam | H04W 36/302 |
| 9,832,735 | B2 | 11/2017 | Terry et al. | |
| 9,867,145 | B2 * | 1/2018 | Bergman | H04W 52/267 |
| 10,057,830 | B2 * | 8/2018 | Chockalingam | H04W 36/0058 |
| 10,349,440 | B2 * | 7/2019 | Ozturk | H04W 52/246 |
| 10,412,591 | B2 * | 9/2019 | Su | H04B 1/3816 |
| 10,728,862 | B2 | 7/2020 | Zhang et al. | |
| 11,463,960 | B2 | 10/2022 | Chen et al. | |
| 11,683,806 | B2 * | 6/2023 | Papasakellariou | H04L 1/1861 370/329 |
| 11,711,811 | B2 * | 7/2023 | Papasakellariou | H04L 5/0053 370/329 |
| 11,910,238 | B2 * | 2/2024 | Dalmiya | H04W 28/08 |
| 12,150,149 | B2 * | 11/2024 | Jin | H04W 76/20 |
| 12,160,867 | B2 * | 12/2024 | Hu | H04L 5/0053 |
| 12,457,055 | B2 * | 10/2025 | Li | H04W 72/232 |
| 2005/0083999 | A1 | 4/2005 | Koo et al. | |
| 2005/0159116 | A1 * | 7/2005 | Xiong | H04B 17/13 455/127.1 |
| 2007/0253385 | A1 | 11/2007 | Li et al. | |
| 2011/0261779 | A1 * | 10/2011 | Liu | H04W 52/50 370/329 |
| 2012/0039267 | A1 * | 2/2012 | Nagata | H04L 5/006 370/329 |
| 2015/0085729 | A1 | 3/2015 | Majjigi et al. | |
| 2015/0351050 | A1 | 12/2015 | Takahashi et al. | |
| 2020/0067661 | A1 | 2/2020 | Siomina et al. | |
| 2020/0329506 | A1 | 10/2020 | Liu et al. | |
| 2021/0144728 | A1 | 5/2021 | Liu et al. | |
| 2021/0152278 | A1 * | 5/2021 | Abdel Shahid | H04L 1/0003 |
| 2021/0352527 | A1 * | 11/2021 | Sridharan | H04L 1/1822 |
| 2022/0400512 | A1 | 12/2022 | Myung et al. | |
| 2023/0012050 | A1 * | 1/2023 | Dalmiya | H04W 28/0942 |

FOREIGN PATENT DOCUMENTS

| | | | |
|---|---|---|---|
| KR | 10-2017-0011486 | A | 2/2017 |
| KR | 10-2017-0096879 | A | 8/2017 |
| KR | 10-1828447 | B1 | 2/2018 |
| KR | 10-2018-0063265 | A | 6/2018 |
| KR | 10-2020-0033801 | A | 3/2020 |
| KR | 10-2021-0102745 | A | 8/2021 |

OTHER PUBLICATIONS

Tsern-Huei Lee, et al., Downlink Power Control Algorithms for Cellular Radio Systems, Feb. 1, 1995.

Trinh Van Chien, et al., Downlink Power Control for Massive MIMO Cellular Systems with Optimal User Association, Jul. 7, 2016.

Noman Akbar, et al., Downlink Power Control in Massive MIMO Networks with Distributed Antenna Arrays, Nov. 13, 2020.

Qiang Wu, Optimum Transmitter Power Control in Cellular Systems with Heterogeneous SIR Thresholds, Jul. 4, 2000.

Jens Zander, Performance of Optimum Transmitter Power Control in Cellular Radio Systems, Feb. 1, 1992.

International Search Report dated Mar. 2, 2023, issued in International Patent Application No. PCT /KR2022/018712.

* cited by examiner

| | | MIMO layers | | | |
|---|---|---|---|---|---|
| | | 1 | 2 | 3 | 4 |
| MCS | 0 | 0.2344 | 0.4688 | 0.7031 | 0.9375 |
| | 1 | 0.3770 | 0.7539 | 1.1309 | 1.5078 |
| | 2 | 0.6016 | 1.2031 | 1.8047 | 2.4063 |
| | 3 | 0.8770 | 1.7539 | 2.6309 | 3.5078 |
| | 4 | 1.1758 | 2.3516 | 3.5273 | 4.7031 |
| | 5 | 1.4766 | 2.9531 | 4.4297 | 5.9063 |
| | 6 | 1.6953 | 3.3906 | 5.0859 | 6.7813 |
| | 7 | 1.9141 | 3.8281 | 5.7422 | 7.6563 |
| | 8 | 2.1602 | 4.3203 | 6.4805 | 8.6406 |
| | 9 | 2.4063 | 4.8125 | 7.2188 | 9.6250 |
| | 10 | 2.5703 | 5.1406 | 7.7109 | 10.2813 |
| | 11 | 2.7305 | 5.4609 | 8.1914 | 10.9219 |
| | 12 | 3.0293 | 6.0586 | 9.0879 | 12.1172 |
| | 13 | 3.3223 | 6.6445 | 9.9668 | 13.2891 |
| | 14 | 3.6094 | 7.2188 | 10.8281 | 14.4375 |
| | 15 | 3.9023 | 7.8047 | 11.7070 | 15.6094 |
| | 16 | 4.2129 | 8.4258 | 12.6387 | 16.8516 |
| | 17 | 4.5234 | 9.0469 | 13.5703 | 18.0938 |
| | 18 | 4.8164 | 9.6328 | 14.4492 | 19.2656 |
| | 19 | 5.1152 | 10.2305 | 15.3457 | 20.4609 |
| | 20 | 5.3320 | 10.6641 | 15.9961 | 21.3281 |
| | 21 | 5.5547 | 11.1094 | 16.6641 | 22.2188 |
| | 22 | 5.8906 | 11.7813 | 17.6719 | 23.5625 |
| | 23 | 6.2266 | 12.4531 | 18.6797 | 24.9063 |
| | 24 | 6.5703 | 13.1406 | 19.7109 | 26.2813 |
| | 25 | 6.9141 | 13.8281 | 20.7422 | 27.6563 |
| | 26 | 7.1602 | 14.3203 | 21.4805 | 28.6406 |
| | 27 | 7.4063 | 14.8125 | 22.2188 | 29.6250 |

FIG.4

APPARATUS AND METHOD FOR CONTROLLING DOWNLINK TRANSMISSION POWER IN WIRELESS COMMUNICATION SYSTEM

CROSS-REFERENCE TO RELATED APPLICATION(S)

This application is a continuation application, claiming priority under § 365(c), of an International application No. PCT/KR2022/018712, filed on Nov. 24, 2022, which is based on and claims the benefit of a Korean patent application number 10-2021-0187732, filed on Dec. 24, 2021, in the Korean Intellectual Property Office, and of a Korean patent application number 10-2022-0017623, filed on Feb. 10, 2022, in the Korean Intellectual Property Office, the disclosure of each of which is incorporated by reference herein in its entirety.

BACKGROUND

1. Field

The disclosure relates in general to a wireless communication system. More particularly, the disclosure relates to an apparatus and method for controlling downlink transmit power in the wireless communication system.

2. Description of Related Art

To meet the demand for wireless data traffic having increased since deployment of $4^{th}$ generation (4G) communication systems, efforts have been made to develop an improved $5^{th}$ generation (5G) or pre-5G communication system. Therefore, the 5G or pre-5G communication system is also called a 'Beyond 4G Network' or a 'Post Long Term Evolution (LTE) System'.

The 5G communication system is considered to be implemented in higher frequency (millimeter wave (mmWave)) bands, e.g., 28 GHz or 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (COMP), reception-end interference cancellation and the like.

In the 5G system, Hybrid frequency shift keying (FSK) and quadrature amplitude modulation (QAM) (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an apparatus and method for controlling downlink transmit power in a wireless communication system.

Additional aspects will be set forth in part in the description which follows and, in part, will be apparent from the description, or may be learned by practice of the presented embodiments.

In accordance with an aspect of the disclosure, a method of operating a base station in a wireless communication system is provided. The method includes decreasing, by the base station, a size of a transport block for a data packet when a size of a downlink data packet is less than or equal to a size of a predetermined minimum allocation resource, determining, by the base station, a transmit signal scaling factor for decreasing transmit power of the data packet, and determining, by the base station, the transmit power of the data packet, based on the transmit signal scaling factor.

In accordance with another aspect of the disclosure, a base station in a wireless communication system is provided. The base station includes a transceiver, memory storing one or more computer programs, and one or more processors communicatively coupled to the transceiver and the memory, wherein the one or more computer programs include computer-executable instructions that, when executed by the one or more processors, cause the base station to decrease a size of a transport block for a data packet when a size of a downlink data packet is less than or equal to a size of a predetermined minimum allocation resource, determine a transmit signal scaling factor for decreasing transmit power of the data packet, and determine the transmit power of the data packet, based on the transmit signal scaling factor.

In accordance with another aspect of the disclosure, one or more non-transitory computer-readable storage media storing one or more computer programs including computer-executable instructions that, when executed by one or more processors of a base station, cause the base station to perform operations are provided. The operations include decreasing, by the base station, a size of a transport block for a data packet when a size of a downlink data packet is less than or equal to a size of a predetermined minimum allocation resource, determining, by the base station, a transmit signal scaling factor for decreasing transmit power of the data packet, and determining, by the base station, the transmit power of the data packet, based on the transmit signal scaling factor.

An apparatus and method according to various embodiments of the disclosure may provide an apparatus and method for controlling downlink transmit power in a wireless communication system.

Other aspects, advantages, and salient features of the disclosure will become apparent to those skilled in the art from the following detailed description, which, take in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 4 illustrates a method for selecting a change of a Modulation & Coding Scheme (MCS) and a Multiple-Input/Multiple-Output (MIMO) layer count to adjust downlink transmit power according to an embodiment of the disclosure;

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

It should be appreciated that the blocks in each flowchart and combinations of the flowcharts may be performed by one or more computer programs which include instructions. The entirety of the one or more computer programs may be stored in a single memory device or the one or more computer programs may be divided with different portions stored in different multiple memory devices.

Any of the functions or operations described herein can be processed by one processor or a combination of processors. The one processor or the combination of processors is circuitry performing processing and includes circuitry like an application processor (AP, e.g. a central processing unit (CPU)), a communication processor (CP, e.g., a modem), a graphics processing unit (GPU), a neural processing unit (NPU) (e.g., an artificial intelligence (AI) chip), a Wi-Fi chip, a Bluetooth® chip, a global positioning system (GPS) chip, a near field communication (NFC) chip, connectivity chips, a sensor controller, a touch controller, a finger-print sensor controller, a display drive integrated circuit (IC), an audio CODEC chip, a universal serial bus (USB) controller, a camera controller, an image processing IC, a microprocessor unit (MPU), a system on chip (SoC), an integrated circuit (IC), or the like.

Figure 1:
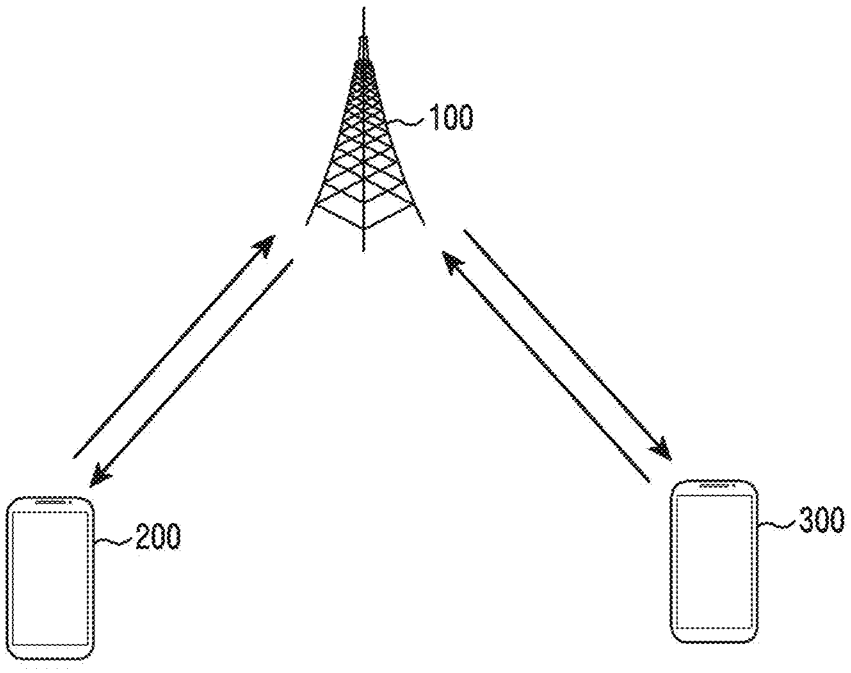
FIG. 1 illustrates a wireless communication system according to an embodiment of the disclosure.

FIG. 1 illustrates a wireless communication system according to an embodiment of the disclosure.

Referring to FIG. 1, as part of nodes which use a radio channel, a base station 100, a terminal 200, and a terminal 300 are exemplified in the wireless communication system. Although only one base station is illustrated in FIG. 1, other base stations identical or similar to the base station 100 may be further included.

The base station 100 is a network infrastructure which provides a radio access to the terminals 200 and 300. The base station 100 has a coverage defined as a specific geographic region, based on a distance capable of transmitting a signal. In addition to the term 'base station', the base station 100 may be referred to as an 'Access Point (AP)', an 'eNodeB (eNB)', a '5$^{th}$ Generation (5G) node', a 'next generation NodeB (gNB)', a 'wireless point', a 'Transmission/Reception Point (TRP)', or other terms having equivalent technical meanings.

As a device used by a user, each of the terminal 200 and the terminal 300 communicates with the base station 100 through the radio channel. In addition to the term 'terminal', each of the terminals 200 and 300 may be referred to as a 'User Equipment (UE)', a 'Customer Premises Equipment (CPE)', a 'mobile station', a 'subscriber station', a 'remote terminal', a 'wireless terminal', an 'electronic device', a 'user device', or other terms having equivalent technical meanings.

Figure 2:
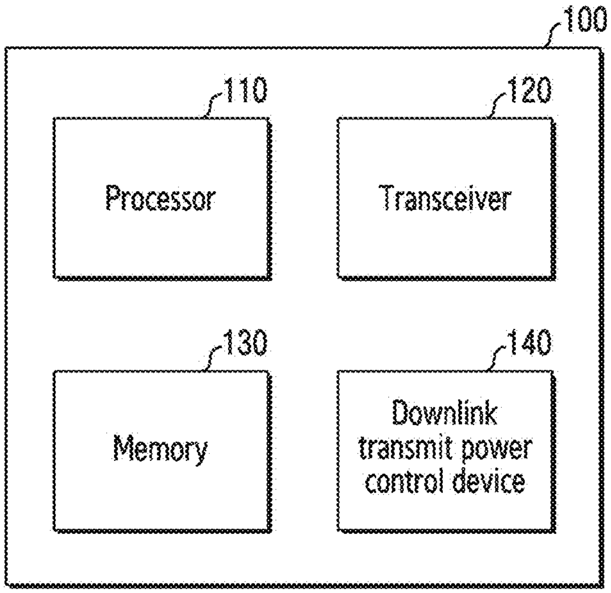
FIG. 2 illustrates a configuration of a base station in a wireless communication system according to an embodiment of the disclosure.

FIG. 2 illustrates a configuration of a base station in a wireless communication system according to an embodiment of the disclosure. The configuration of FIG. 2 may be understood as a configuration of the base station 100. Hereinafter, the term '~unit', '~device', or the like implies a unit of processing at least one function or operation, and may be implemented in hardware or software or in combination of the hardware and the software.

Referring to FIG. 2, the base station includes a processor 110, a transceiver 120, memory 130, and a downlink transmit power control device 140.

The processor 110 controls overall operations of the base station. For example, the processor 110 transmits and receives a signal via the transceiver 120. Further, the processor 110 writes data to the memory 130, and reads the data. In addition, the processor 110 may control downlink transmit power via the downlink transmit power control device 140. The processor 110 may include at least one processor.

The transceiver 120 is coupled to the processor 110 to transmit and receive a signal. Accordingly, all or part of the transceiver 120 may be referred to as a 'transmitter', a 'receiver', or a 'transceiver'.

The memory 130 is coupled to the processor 110 to store data such as a basic program, application program, configuration information, or the like for an operation of the base station. The memory 130 may be constructed of volatile memory, non-volatile memory, or a combination of the volatile memory and the non-volatile memory. In addition, the memory 130 provides stored data according to a request of the processor 110.

The downlink transmit power control device 140 is coupled to the processor 110 to control downlink transmit power required to transmit a signal from the base station to a terminal.

Various embodiments of the disclosure relate to an apparatus and method for controlling downlink transmit power of a cellular base station system according to a downlink traffic condition. The advance of a communication transmission/reception technique and device results in an increase in a Multiple-Input/Multiple-Output (MIMO) layer count or a modulation order, thereby improving spectral efficiency applied to wireless communication day by day. A communication method having the improved spectral efficiency may improve a transmission data-rate, but performance thereof may be significantly affected by surrounding environments, in particular, power of an interference signal transmitted from a neighboring base station.

In particular, in an urban area or the like in which a data traffic demand is densely concentrated, a plurality of base station devices and antennas thereof are installed in the form of neighboring cells to satisfy a high system data capacity requirement, thereby serving for a terminal in cell coverage. In this case, the terminal concurrently receives signals transmitted from different base stations in a cell boundary region, which leads to performance deterioration caused by Inter-Cell Interference (ICI).

In order to minimize such performance degradation, each base station shall be able to transmit a signal with power as much as required only when transmission is necessary. In downlink transmission of the base station in a practical commercial network in numerous instances, there are only some cases where a big-sized file requiring a high transfer rate is downloaded or high-definition video is downloaded, and downlink signals of most of base stations may be constructed of common signals which are always on to maintain coverage of a system for all users or data packets which are transmitted to each user but are small in size because a high transfer rate is not required. Examples of such downlink data include a text-based web download or control messages for each higher layer/application.

Cellular communication systems of previous generations including 4G LTE have many signals, such as a pilot channel or a Cell-Specific Reference Signal (CRS), which shall be always transmitted persistently by a base station. However, in a standard of a newly defined $5^{th}$ Generation New Radio (5G NR) system, the base station is allowed to transmit limitedly only when data required in practice is transmitted to one, some, or all users in coverage, thereby reducing influence of inter-cell interference. Therefore, the inter-cell interference occurs due to transmission of short data packets not requiring a significantly high transfer rate in other neighboring cells, resulting in deterioration of downlink transmission quality in a cell requiring a high transfer rate. In particular, in the latest standard such the 5G NR in which interference caused by a signal to be transmitted always is minimized, it may have a grant impact on average network quality. For this reason, in order to improve a high transfer rate experienced by a user in a cellular system, there is a need for a device which controls transmit power transmitted to short data packets to be less than a required level.

The prior art related to various embodiments of the disclosure is as follows.

[1] U.S. Pat. No. 8,170,600, "Method and apparatus for allocating downlink power in wireless communication system"

[2] KR20170011486, "Method and apparatus for controlling transmit power of a base station"

[3] US 2020/0067661 A1, "Controlling Cell-specific Reference Signal (CRS) Bandwidth on a Lean Carrier based on Another Reference Signal Bandwidth"

[4] "Downlink Power Control Algorithms for Cellular Radio Systems", IEEE Trans. Vehicular Technology vol. 44, no. 1, February 1995

[5] U.S. Pat. No. 8,694,042 B2, Qualcomm, "Method and Apparatus for Determining a Base Station's Transmission Power Budget"

[6] EP0997008 B1, "Method and Apparatus for Downlink Power Control in Macro Diversity Radio System"

The prior arts [1] and [2] propose calculating of allocation power through an SNIR required for each terminal, based on reception intensity and downlink quality information of terminals.

The prior art [3] is used limitedly for a 4G LTE system which uses a Cell-specific Reference Signal (CRS). It is not for a data channel according to a feature of a system which operates the CRS, and may be used for adjusting network coverage of each macro/pico/femto cell in a heterogeneous network.

Another prior art [4] assumes that all information for downlink transmit power transmitted by each base station, receive power of a base station's signal desired by terminals in each base station (after path loss), and interference signal receive power of a neighboring base station's signal may be collected and shared in one place. That is, it is assumed that an additional downlink transmit power control server coupled to all base stations may be present, or all base stations may exchange related information with each other on a real-time basis. With a magnitude of signal power of all base stations, received by each terminal, a Signal-to-Interference Ratio (SIR) of the terminal and an achievable data-rate under this condition may be estimated. Therefore, each base station may determine its own output level so that a sum of the achievable data-rates for all terminals for which a downlink service is executed at a specific timing has a maximum value.

As a more detailed method than the above method, the prior art [5] proposes a method in which downlink loading information is mutually exchanged by two or more base stations (through an additional server or the like between a plurality of base stations) and a budge of transmit power is determined, thereby increasing/decreasing downlink transmission. In particular, the prior art [6] proposes a similar operation using a Mobile Switching Center (MSC)/Base Station Controller (BSC) in Third Generation Direct Sequence-Code Division Multiple Access (3G DS-CDMA).

The aforementioned prior art has the following problem.

A method of the prior arts [1] and [2] predicts a Signal-to-noise and Interference Ratio (SINR) in a downlink data channel received by a terminal from reception sensitivity and downlink quality information measured by terminals by using a downlink reference signal. However, the latest communication standards, including a 5G NR system, differs from the conventional communication system in which a downlink reference signal such as a CRS is always transmitted to have a constant reception electric field even within a data channel. In the latest communication standards, a terminal is not able to directly measure interference in a neighboring cell within a downlink data channel transmitted for each user, and is able to additionally measure an SINR including interference of neighboring cells only from reference signals, e.g., a Channel State Information-Reference Signal (CSI-RS) or a Synchronization Signal Block (SSB), broadcast for all users. Since an interference amount of a neighboring cell, measured in a reference signal broadcast with a regular period does not have the same pattern as an interference amount of a neighboring cell in a data interference channel, which occurs only at the presence of each user traffic transmission, a mismatch may occur between SINRs measured by a terminal. In particular, when a base station uses a massive MIMO system constructed of a plurality of antennas, there is a significant difference in a broadcast signal radiated throughout a cell, a signal and interference power in a downlink data channel to which beamforming for a specific user is applied, and an SINR estimated by using this.

A method of the prior art [4] may provide mathematically a highest transmission rate sum for all cells. However, in order for this function to operate properly, first, a terminal shall measure receive power separately for a downlink signal of a neighboring base station (step a). Next, receive power of each neighboring base station and a serving base station shall be all reported to the serving base station (step b). In a next step, receive power information reported to each base station is collected to one downlink transmit power control server, or is mutually shared to base stations in all networks (step c). Finally, based on the collected receive power information, the downlink transmit power control server calculates transmit power of each base station such that an achievable data-rate has a maximum sum, and transmits it to each base station (step d). Alternatively, each computational process is performed independently in each individual base station.

Such a complex configuration step is not realistic to implement in practice due to the following constraint. First, in the step (a), measurement of a terminal in practical implementation is significantly limited in general since calculation capability of the terminal is persistently consumed. In the next step (b), a report for a measurement result also has an impact on uplink resource consumption and reception performance including uplink coverage. Therefore, for a downlink transmit power control operation in a practical commercial network, there is a need for a method also applicable to a limited terminal's measurement information and report (in particular, minimizing the use of measuring and reporting for a base station of a neighboring different cell).

In addition, in the final processes in which measurement information of a terminal in each base station is collected for the entire network to calculate an achievable data-rate of each terminal from the collected measurement information, even though it is possible to calculate it under the assumption that there is not many base stations in a network to be considered, it is impossible in practice to calculate it on a real-time basis in an environment of operating a practical network in which significantly many base stations are present in the same band.

In particular, for a massive MIMO base station, downlink transmit power is not evenly radiated in all directions, but is transmitted through a user-specific beam. Therefore, transmission/reception signals and beam information for all considerable base stations and terminals shall be measured, reported, and collected by considering even an influence of a beam, as to a specific beam used in transmission instantaneously in each base station and also a specific magnitude of an interference reception signal received by a terminal belonging to another base station when transmission is performed using the beam.

Even if it may be assumed that it is possible to secure such information, since information such as a beam direction or the like is significantly changed just by a change in an amount of a resource to be allocated, a target terminal served by some base stations, or the like, it is impossible to realize a data rate calculated based on previous information as practical performance.

Various embodiments of the disclosure have the following purpose.

In particular, in a cellular system served through a plurality of base stations densely installed in a narrow region, a method of controlling downlink transmit power is necessary to improve downlink reception quality of an inter-cell boundary region. For a practical operation, there is a need for an apparatus and method for simply controlling downlink transmit power of each serving cell by utilizing, to the minimum extent possible, information on a terminal's electric field environment of a neighboring cell, a beamforming shape, transmit power density, or the like.

Among device configurations described below, a block may be replaced with a unit, a configuration, a device, or a combination of devices or the like.

Figure 3:
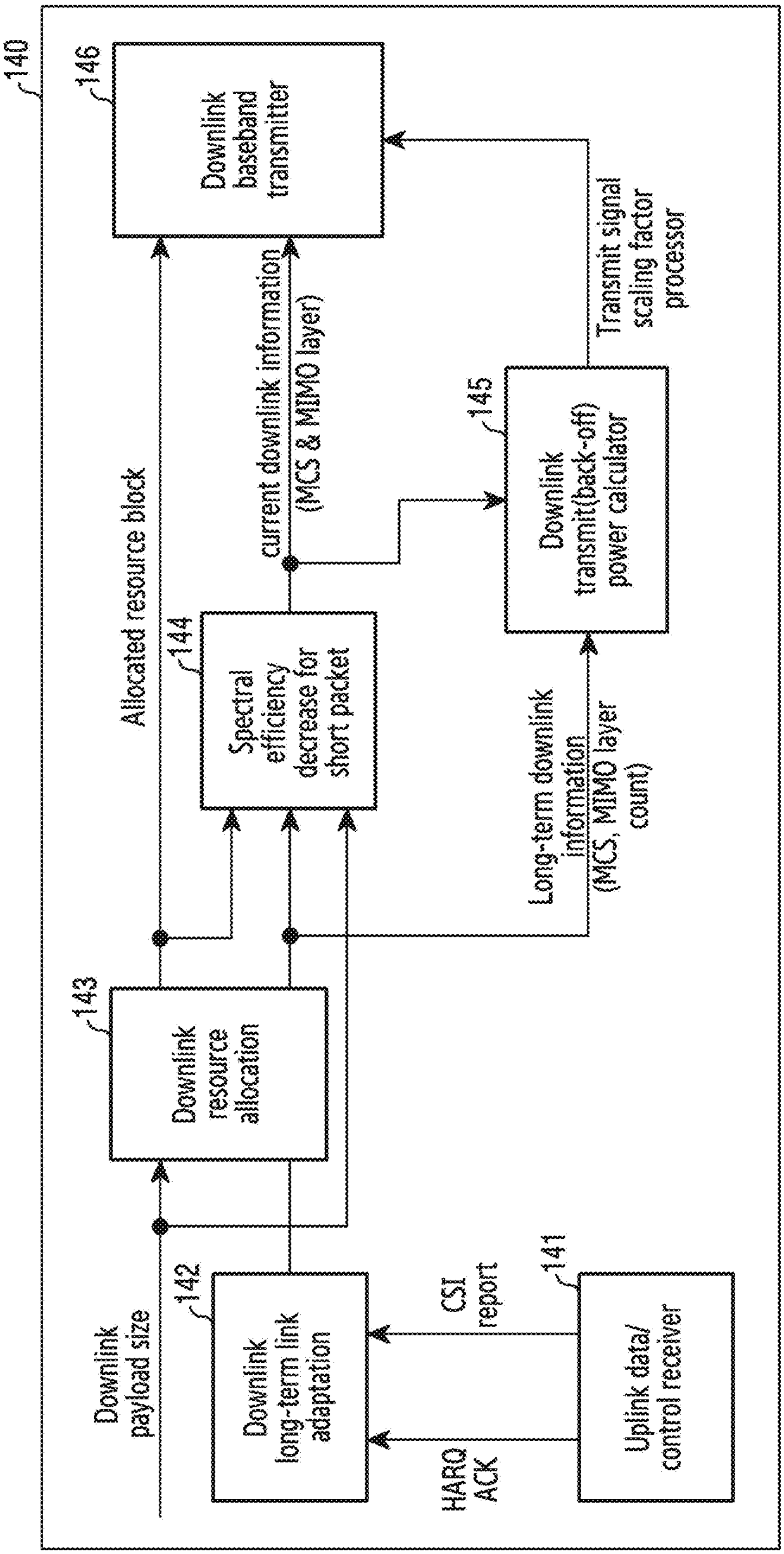
FIG. 3 illustrates a configuration of a downlink transmit power control device in a base station according to an embodiment of the disclosure.

FIG. 3 illustrates a configuration of a downlink transmit power control device in a base station according to an embodiment of the disclosure.

The downlink transmit power control device 140 according to various embodiments of the disclosure is for controlling base station's transmit signal power of a downlink data signal having a small payload size in particular among terminals served in a cellular system.

The downlink transmit power control device 140 according to various embodiments of the disclosure includes an uplink data/control receiver block 141, a downlink long-term link adaptation block 142, a downlink resource allocation block 143, a 'spectral efficiency decrease for short packet' block 144, a downlink transmit(back-off) power calculator block 145, and a downlink baseband transmitter block 146.

The downlink transmit power control device 140 transmits HARQ ACK information and CSI report information to the long-term link adaptation block 142.

An example of link adaptation of a downlink channel and a resource allocation process will be described in relation to an operation of the downlink transmit power control device proposed in various embodiments of the disclosure.

(1) The long-term link adaptation block 142 of a base station periodically receives, through a CSI report of a user terminal, Channel Quality Indicator (CQI) information and a downlink MIMO layer count, which may be received by the terminal, and stores this as a reference result for downlink allocation for the terminal. In addition, a result of link adaptation is corrected by continuously accumulating and referring Hybrid Automatic Repeat request Acknowledgement/Non-Acknowledgement (HARQ ACK/NACK) information. A result of this process is output in general in the form of a Modulation & Coding Scheme (MCS) and a MIMO layer count receivable by the user terminal.

(2) For each user, from the MCS and MIMO layer count determined and transferred from the long-term link adaptation block 142, the downlink resource allocation (or resource size determination) block 143 determines a size (a Resource Block (RB) or Resource Block Group (RBG) unit) of a frequency resource to be allocated to a corresponding user by considering a size of a downlink data payload transferred from a higher block. More specifically, a basic unit of a transmittable data size is determined in the form of a product between spectral efficiency corresponding to each MCS and MIMO layer and a count of data tones in a frequency unit resource (RB or RBG), and a frequency resource count is selected such that a transmission data block size is equal to or greater than an amount of data to be transmitted to a user.

(2-1) When data in a corresponding user transmission queue is not entirely transmitted even if all available frequency resources remaining in this slot are used, only available frequency resources are allocated, and the remaining data waits for a next transmission opportunity.

(2-2) On the contrary, even if the data in the user transmission queue is small in size, a resource having a predetermined minimum size shall be allocated, and the minimum-sized resource may be a plurality of RBs or RBGs according to base station's selection or operational restrictions. In particular, when the available frequency resources are not used for any downlink transmission, a minimum resource size does not affect performance within this base station.

In general, allocation information for downlink transmission may be determined only with two blocks, i.e., the aforementioned downlink long-term link adaptation block 142 and the downlink resource allocation block 143.

In various embodiments of the disclosure, in addition to the two blocks, i.e., the aforementioned long-term link adaptation block 142 and the downlink resource allocation block 143, processing of the 'spectral efficiency decrease for short packet' block 144, the downlink transmit (back-off) power calculator block 145, and the downlink baseband transmitter block 146 is disclosed. Accordingly, in particular, although a higher layer downlink transmission queue has a small data size, a more effective transmission method in terms of transmission energy consumption of a base station and interference on neighboring cells is proposed as to downlink channel transmission having a restriction in a minimum allocation resource size.

FIG. 4 illustrates a method for selecting a change of an MCS or a MIMO layer count to adjust downlink transmit power according to an embodiment of the disclosure.

(1) In particular, when a data size of a queue is significantly small compared to a transport block size determined by allocation information of a slot, the 'spectral efficiency decrease for short packet' block 144 decreases an MCS or a MIMO layer count such that the transport block size is greater than or equal to queue data but is as close to a size of queue data as possible.

(1-1) When the size of the allocated resource is less than or equal to a specific value (in particular, when the size of the allocated resource is equal to a predetermined minimum allocation resource size), the following operation is performed. However, if the size of the allocated resource is significantly small even if it is not an operating minimum value, since a size of a transport block is adjustable finer in general when decreasing an MCS than when decreasing a resource size, there is no need to limit its use to a minimum allocated resource.

(1-2) Starting from an MCS and a MIMO layer according to downlink long-term link adaptation of a user terminal, the MCS or the MIMO layer is decreased gradually, and a transport block size based on a new MCS and MIMO layer and an allocated resource size is calculated again. If the newly calculated transport block size is still greater than a size of queue data, the process of decreasing the MCS and the MIMO layer count is repeated until it becomes less than or equal the size of queue data.

(1-3) An embodiment illustrating a method of determining whether to decrease an MCS or whether to decrease a MIMO layer count is shown in FIG. 4. Spectral efficiency representing the number of per-tone transmittable bits, corresponding to each MIMO layer and MCS, is indicated in the table of FIG. 4. It is assumed that a user's MIMO layer count is 4 and MCS=15, according to long-term link adaptation. First, while maintaining the MIMO layer count to 4 and decreasing the MCS to 14, 13, 12, 11, the size of the transport block is compared to the queue data size. If the transport block size is still great, next, the MIMO layer count is decreased to 3 and the MCS is continuously decreased to 14, 13, 12, 11, ~ in that order. If the transport block size is greater than the queue data size even in case of MIMO layer=3 and MCS=5, it is repeated by continuously decreasing the MCS again starting from the MIMO layer count=2 and MCS=9.

(1-3-1) As shown in FIG. 4, an MCS is decreased first, and then a lowest MCS supported for each MIMO layer count is selected. It is exemplified in an embodiment of FIG. 4 that up to MCS=11 is selected when the MIMO layer count is 4, and up to MCS=5 is selected when the MIMO layer count is 3. The lowest MCS depending on each MIMO layer count may be selected empirically according to implementation of a base station, by considering terminal's reception performance or the like depending on a representative channel environment.

(1-3-2) In a section in which the MIMO layer count changes, it is decreased gradually starting from an MCS which is highest and also has spectral efficiency lower than an MCS of an immediate previous MIMO layer count (an MCS upper limit). According to an embodiment of FIG. 4, when looking for a transport block size smaller than the queue data, it is shown that (MIMO layer count=4, MCS=11) is attempted, followed by (MIMO layer count=3, MCS=14), then (MIMO layer count=3, MCS=5) is attempted, followed by (MIMO layer count=3, MCS=9), and then (MIMO layer count=2, MCS=3) is attempted, followed by (MIMO layer count=1, MCS=6). However, since an MCS value when each MIMO layer count of FIG. 4 is changed is only one example, it may be selected differently depending on an operation of a base station.

(1-3-2) An embodiment of FIG. 4 illustrates a case where the MIMO layer count changes the most, that is, where long-term link adaptation results in MIMO layer count=4. In case of long-term MIMO layer count=3 and MCS=25, a sufficiently small transport block size is found while decreasing up to MIMO layer count=3 and MCS=24, 23, 22, ~, 6, 5. In this case, the transport block size is also identified by selecting MCS=5, followed by (MIMO layer count=2, MCS=9).

(2) Next, for a short packet having a decreased transport block size, downlink transmit power is calculated by the downlink transmit(backoff) power calculator block 145.

(2-1) A packet which is allocated a resource having a minimum size and of which a transport block size determined with a long-term MCS and a MIMO layer count is greater than queue data is changed to have a lower MCS and MIMO layer count via a 'spectral efficiency decrease for short packet' device. The less the MCS or the MIMO layer count, the lower an SNIR required to satisfy specific performance (e.g., a block error rate of 10%). Therefore, when transmitted with the same power, there is a margin in which reception performance is higher than other packets. Alternatively, since the SINR achievable with the same transmit power may be considered to be excessive compared to a transfer rate, the transmit power may be decreased to match the decreased transfer rate.

(2-2) The downlink transmit power calculator block 145 uses the number of long-term MCSs and MIMO layer counts and the number of MCSs and MIMO layer counts re-adjusted by the 'spectral efficiency decrease for short packet' block 144 as an input, and pre-stores required SNIR values which may be produced according to expected link performance, in the form of a table, with respect to a combination of each MCS and MIMO layer count.

(2-3) The downlink transmit power calculator block 145 may read, from the table, each of a required SINR (in dB scale) for the long-term MCS and long-term MIMO layer count value and a required SNIR for the MCS and MIMO layer count value corrected according to a transport block size of a short packet and may determine a downlink transmit power backoff value from a difference thereof.

(2-4) However, since a short packet to be considered may need to have higher reliability (or equivalently, a low block error rate) according to Quality of Service (QOS) or the like, an offset based on the QoS is considered. In addition, a transmit power backoff value may be limited to an upper limit (MAXBackOff) by considering a quantization loss or the like based on digital processing. The transmit power backoff value may be expressed by the following Equation.

BackOff[dB]=min(MAXBackOff,reqSINR(MCSlong-term,MIMO_Layerlong-term)−reqSINR(MCSadjust,MIMO_Layeradjust)+OffsetQoS) Equation 1

(2-5) The value of the formula above is converted into a transmit signal scaling factor by being subjected to linear transformation and applying a square root, and is transferred to a device for adjusting transmit power.

Figure 5:
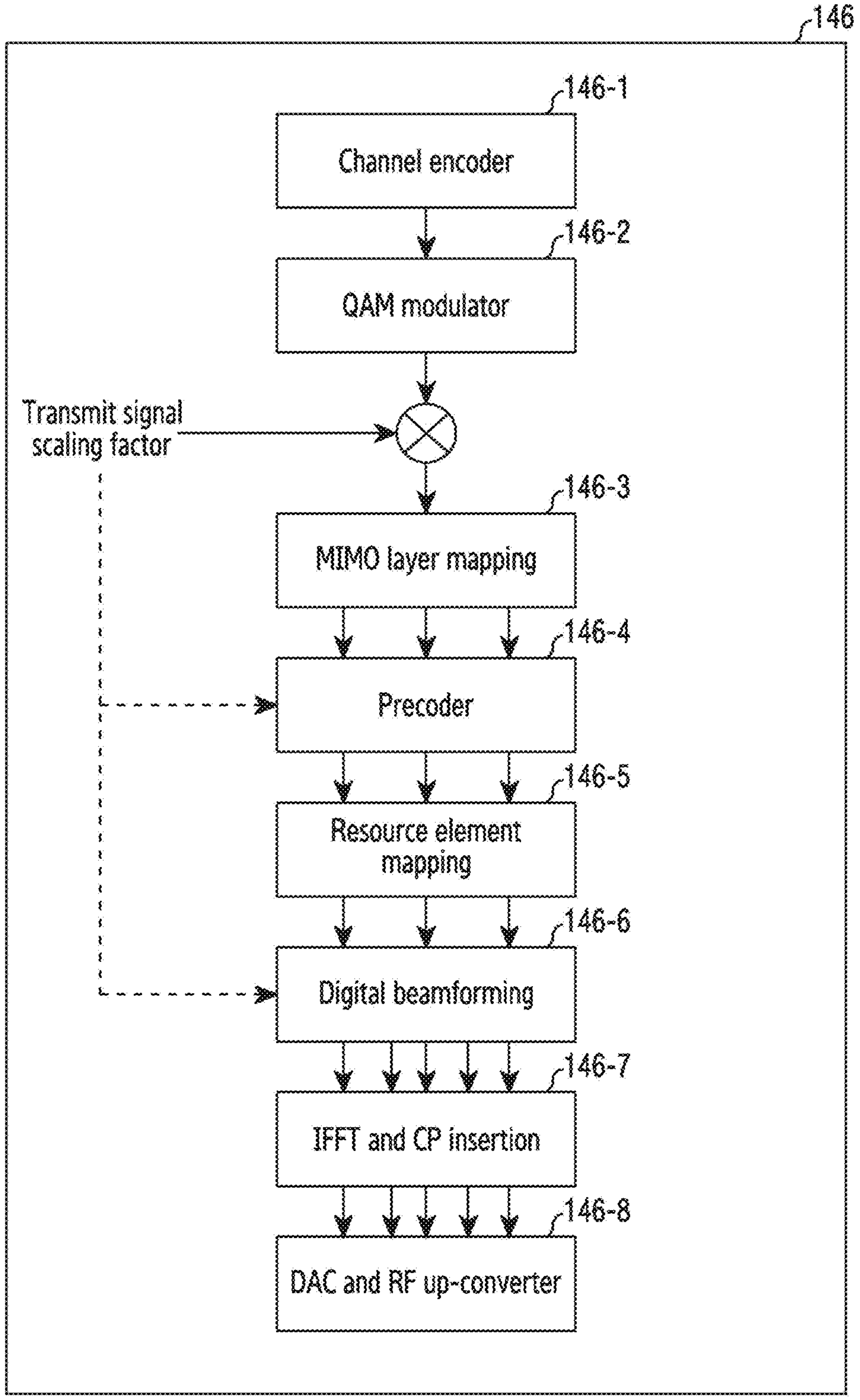
FIG. 5 illustrates a configuration of a downlink baseband transmitter in a downlink transmit power control device according to an embodiment of the disclosure.

FIG. 5 illustrates a configuration of a downlink baseband transmitter in a downlink transmit power control device according to an embodiment of the disclosure.

(3) The downlink baseband transmitter block 146 multiplies a baseband transmit signal by a transmit signal scaling factor determined in a transmit power calculator device for each user to directly increase/decrease a magnitude of downlink transmit power.

(3-1) FIG. 5 illustrates the downlink baseband transmitter block 146 in greater detail. Referring to FIG. 5, the downlink baseband transmitter block 146 includes a channel encoder 146-1, a QAM modulator 146-2, MIMO layer mapping 146-3, a precoder 146-4, resource element mapping 146-5, digital beamforming 146-6, Inverse Fast Fourier Transform (IFFT) and Cyclic Prefix (CP) insertion 146-7, and a Digital to Analog Converter (DAC) and Radio Frequency (FR) up-converter 146-8.

A data bit-stream which first has undergone channel coding for error correction in the channel encoder 146-1 is transformed in the form of a QAM symbol such as QPSK, 16QAM, 64QAM, 256QAM, or 1024QAM via the QAM modulator 146-2. Ever since this operation, a transmit signal includes physical concept of magnitude. Therefore, an output symbol of each QAM modulator 146-2 may be multiplied by the transmit signal scaling factor transferred in a previous device to adjust transmit signal power.

(3-2) Instead of directly multiplying the output of the QAM modulator 146-2 by the transmit signal scaling factor, a method of adjusting transmit signal power also has the same effect irrespective of a physical processing location in such a manner that a block, i.e., the precoder 146-4 or the digital beamforming 146-6, which multiplies a factor for each antenna at a later time, multiplies the transmit signal scaling factor in advance.

Figure 6:
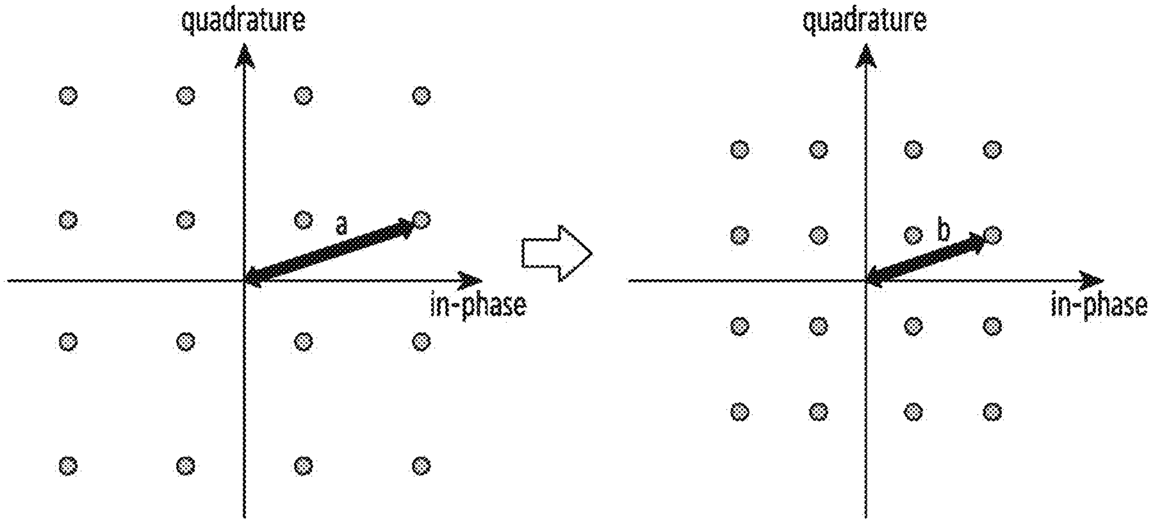
FIG. 6 illustrates an example of a method of multiplying a transmit signal scaling factor at an output end of a modulator according to an embodiment of the disclosure.

FIG. 6 illustrates an example of a method of multiplying a transmit signal scaling factor at an output end of a modulator according to an embodiment of the disclosure.

Referring to FIG. 6 is for a case of multiplying a transmit signal scaling factor at an output end of a 16QAM modulator. When an amplitude of any QAM symbol is denoted by a, it is converted into the same QAM symbol having an amplitude of b by multiplying a transmit signal scaling factor b/a.

Hereinafter, an operation and method of a device according to various embodiments of the disclosure will be described.

According to various embodiments of the disclosure, compared to a transfer rate obtained as a result of long-term adaptation of a specific user, an embodiment of a case where data in a queue is small and thus is transmitted with a much lower transfer rate may be considered.

(1) As an embodiment, a shape of a minimum-sized resource to be allocated is specifically assumed as follows. It is assumed a case where the resource is constructed of 192 tones in a frequency direction and is constructed of 11 symbols in a time direction, by excluding a control channel and a reference signal. If a long-term downlink adaptation result of a terminal results in (MCS=15 [based on 256QAM MCS], MIMO layer count=2), a size of a transport block which may be transmitted through the resource and the MCS corresponds to 1,857 bytes.

(2) In this case, if a size of data transferred from a higher layer and waiting to be transferred to a corresponding user is 350 bytes in total, including various headers, data of the remaining at least 1,300 bytes is transferred by being padded with a meaningless value when an MCS and a MIMO layer count are directly used. Therefore, meaningful transmission is not achieved in terms of user experience in practice. Therefore, assuming that a 'spectral efficiency decrease for short packet' device conforms to the embodiment of FIG. 4, while continuously decreasing the MCS and the MIMO layer count from a link adaptation value, a combination having a greatest value as well as being greater than or equal to a size of data to be transmitted may be newly found. Selecting of a combination of (MCS=5, MIMO layer count=1) leads to a result in which a size of a transport block to be transmitted in practice is significantly close to 350 bytes.

(3) A transmit power (backoff) control value calculator device has an accurate required SINR table for a combination of each MCS and MIMO layer count through simulation or practical measurement. Herein, which value the SINR table is filled with is out of the scope of the disclosure. Therefore, it is assumed in this embodiment that the required SINR is decreased by 0.5 dB whenever the MCS is decreased one by one or a size of a transport block is decreased by changing the MIMO layer count. Since an original link adaptation value is (MCS=15, MIMO layer count=2), and a value modified by the 'spectral efficiency decrease for short packet' device is (MCS=5, MIMO layer count=1), simply assuming that an embodiment of changing the MIMO layer count of FIG. 5 is used again, it may be calculated as follows. The MCS may be decreased throughout 12 steps from (MCS=15, MIMO layer count=2) to (MCS=3, MIMO layer count=2), and the MCS and the MIMO layer count are decreased throughout 14 steps in total until (MCS=5, MIMO layer count=1) throughout (MCS=6, MIMO layer count=1). Therefore, a backoff may be obtained as much as 7 dB under the assumption that each SINR interval is 0.5 dB. Since the SINR table has all MCSs and MIMO layer counts in practice, it may be obtained more simply with only an SINR difference for a pair of two input values.

(4) When an upper limit value of backoff is greater than 7 dB and there is no additional QoS offset, an output of the downlink transmit(backoff) power calculator block 145 is 7 dB. A dB scale is converted to be linear, and is subjected to reciprocal and square root operations. Therefore, square root (sqrt)(⅕) is transferred to the downlink baseband transmitter block 146 as a 'transmit signal scaling factor' value.

(5) Finally, the downlink baseband transmitter block 146 receives the sqrt(⅕) of the 'transmit signal scaling factor' value and multiplies all QAM modulation signals of a downlink data signal of a corresponding user by the received value, thereby decreasing a transmit power amount by 7 dB.

The downlink transmit power control device 140 for controlling downlink transmit power of a short packet proposed in various embodiments of the disclosure typically includes the following three configuration.

(1) The 'spectral efficiency decrease for short packet' block 144 which decreases an MCS or a MIMO layer count to make a transport block size be greater than or equal to queue data but be as close to a size of the queue data as possible, in a case where a size of data remaining in a transmission queue of a higher layer in order to be transmitted to a corresponding user is very small compared to a transport block size determined by link adaptation of the user.

(2) The downlink transmit(backoff) power calculator block 145 which is configured to calculate a backoff value capable of decreasing transmit power to the maximum extent possible while maintaining required performance, with respect to short packets of which a transport block size is decreased as a processing result of the 'spectral efficiency decrease for short packet' block 144.

(3) The downlink baseband transmitter block 146 which changes a magnitude of all QAM signals constituting a downlink data channel of a specific user, by using a 'transmit signal scaling factor' transferred as a processing result of the downlink transmit (back-off) power calculator block 145.

Figure 7:
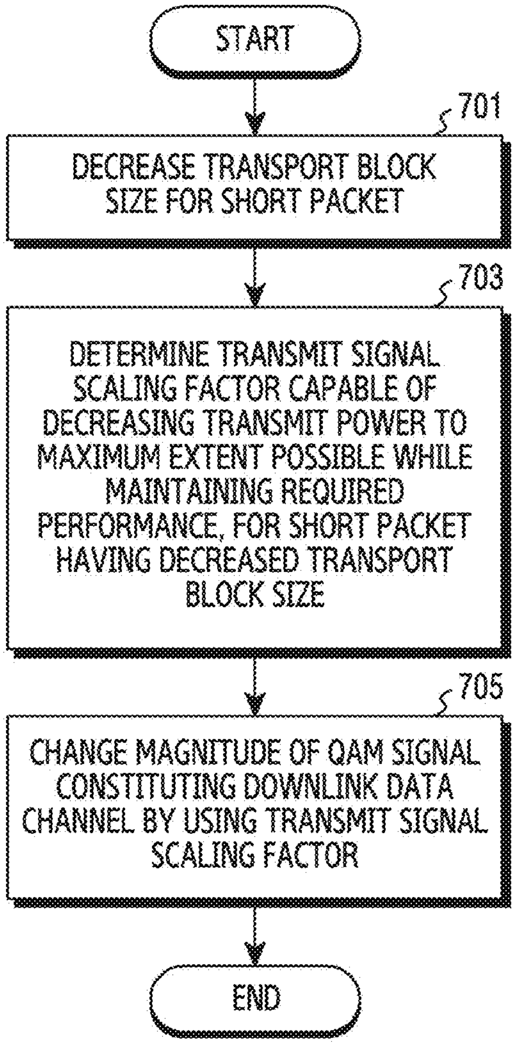
FIG. 7 illustrates a process for controlling downlink transmit power in a wireless communication system according to an embodiment of the disclosure.

FIG. 7 illustrates a process for controlling downlink transmit power in a wireless communication system according to an embodiment of the disclosure.

The embodiment of FIG. 7 may be performed by the aforementioned downlink transmit power control device 140 included in a base station. Alternatively, the embodiment of FIG. 7 may be performed by a device including the 'spectral efficiency decrease for short packet' block 144, the downlink transmit (back-off) power calculator block 145, and the downlink baseband transmitter block 146.

The downlink transmit power control device 140 performing the embodiment of FIG. 7 may include at least one processor, memory, and a transceiver, in addition to the configuration of FIG. 3.

Before operation 701, the downlink transmit power control device 140 may receive terminal's HARQ ACK information, terminal's uplink data including a CSI report, and/or uplink control information. The downlink transmit power control device 140 may determine an MCS and MIMO layer count for a terminal by performing long-term link adaptation, based on the received terminal's uplink data and/or uplink control information. The downlink transmit power control device 140 may allocate a downlink resource for a user terminal, based on the determined MCS and MIMO layer count, by considering a size of a downlink data payload received from a higher layer. In this process, the downlink transmit power control device 140 may determine a size of a transport block for the user terminal.

In operation 701, the downlink transmit power control device 140 decreases the transport block size for a short packet. The short packet refers to a data packet when a data size of a queue is less than or equal to a specific ratio compared to the transport block size determined by allocation information of a slot, or when the data size of the queue is less than or equal to a pre-defined minimum allocation resource size. If the data size of the queue is significantly small compared to the transport block size determined by the allocation information of the slot, the downlink transmit power control device 140 decreases an MCS or a MIMO layer count such that the transport block size is greater than or equal to queue data but is as close to a size of the queue data as possible.

(1-1) When the size of the allocated resource is less than or equal to a specific value (in particular, when the size of the allocated resource is equal to a predetermined minimum allocation resource size), the following operation is performed. However, if the size of the allocated resource is significantly small even if it is not an operating minimum value, since a size of a transport block is adjustable finer in general when decreasing an MCS than when decreasing a resource size, there is no need to limit its use to a minimum allocated resource.

(1-2) Starting from an MCS and a MIMO layer according to downlink long-term link adaptation of a user terminal, the MCS or the MIMO layer is decreased gradually, and a transport block size based on a new MCS and MIMO layer and an allocated resource size is calculated again. If the newly calculated transport block size is still greater than a size of queue data, the process of decreasing the MCS and the MIMO layer count is repeated until it becomes less than or equal the size of queue data.

(1-3) An embodiment illustrating a method of determining whether to decrease an MCS or whether to decrease a MIMO layer count is shown in FIG. 4. Spectral efficiency representing the number of per-tone transmittable bits, corresponding to each MIMO layer and MCS, is indicated in the table of FIG. 4. It is assumed that a user's MIMO layer count is 4 and MCS=15, according to long-term link adaptation. First, while maintaining the MIMO layer count to 4 and decreasing the MCS to 14, 13, 12, 11, the size of the transport block is compared to the queue data size. If the transport block size is still great, next, the MIMO layer count is decreased to 3 and the MCS is continuously decreased to 14, 13, 12, 11, ~ in that order. If the transport block size is greater than the queue data size even in case of MIMO layer=3 and MCS=5, it is repeated by continuously decreasing the MCS again starting from the MIMO layer count=2 and MCS=9.

In operation 703, for a short packet having a decreased transport block size, the downlink transmit power control device 140 determines the transmit signal scaling factor capable of decreasing transmit power to the maximum extent possible while maintaining required performance.

(2-1) A packet which is allocated a resource having a minimum size and of which a transport block size determined with a long-term MCS and a MIMO layer count is greater than queue data is changed to a lower MCS and MIMO layer count via a 'spectral efficiency decrease for short packet' device. The less the MCS or the MIMO layer count, the lower an SNIR required to satisfy specific performance (e.g., a block error rate of 10%). Therefore, when transmitted with the same power, there is a margin in which reception performance is higher than other packets. Alternatively, since the SINR achievable with the same transmit power may be considered to be excessive compared to a transfer rate, the transmit power may be decreased to match the decreased transfer rate.

(2-2) The downlink transmit power calculator block 145 uses the number of long-term MCSs and MIMO layer counts and the number of MCSs and MIMO layer counts re-adjusted by the 'spectral efficiency decrease for short packet' block 144 as an input, and pre-stores required SNIR values which may be produced according to expected link performance, in the form of a table, with respect to a combination of each MCS and MIMO layer count.

(2-3) The downlink transmit power calculator block 145 may read, from the table, each of a required SINR (in dB scale) for the long-term MCS and long-term MIMO layer count value and a required SNIR for the MCS and MIMO layer count value corrected according to a transport block size of a short packet and may determine a downlink transmit power backoff value from a difference thereof.

(2-4) However, since a short packet to be considered may need to have higher reliability (or equivalently, a low block error rate) according to Quality of Service (QOS) or the like, an offset based on the QoS is considered. In addition, a transmit power backoff value may be limited to an upper limit (MAXBackOff) by considering a quantization loss or the like based on digital processing. The transmit power backoff value may be expressed by the following Equation.

$$\text{BackOff[dB]}=\min(\text{MAXBackOff},\text{reqSINR}(\text{MCSlong-term},\text{MIMO\_Layerlong-term})-\text{reqSINR}(\text{MCSadjust},\text{MIMO\_Layeradjust})+\text{OffsetQoS}) \quad \text{Equation 2}$$

(2-5) The value of the formula above is converted into a transmit signal scaling factor by being subjected to linear transformation and applying a square root.

In operation 705, the downlink transmit power control device 140 changes a magnitude of a QAM signal constituting a downlink data channel by using a transmit signal scaling factor to adjust/determine a magnitude of downlink transmit power.

(3) The downlink transmit power control device 140 multiplies a downlink baseband transmit signal by the transmit signal scaling factor determined for each user to directly increase/decrease the magnitude of downlink transmit power.

(3-1) A configuration of the downlink transmit power control device 140 may include the channel encoder 146-1, the QAM modulator 146-2, the MIMO layer mapping 146-3, the precoder 146-4, the resource element mapping 146-5, the digital beamforming 146-6, the Inverse Fast Fourier Transform (IFFT) and Cyclic Prefix (CP) insertion 146-7, and the Digital to Analog Converter (DAC) and Radio Frequency (FR) up-converter 146-8.

A data bit-stream which first has undergone channel coding for error correction in the channel encoder 146-1 is transformed in the form of a QAM symbol such as QPSK, 16QAM, 64QAM, 256QAM, or 1024QAM via the QAM modulator 146-2. Ever since this operation, a transmit signal includes physical concept of magnitude. Therefore, an output symbol of each QAM modulator 146-2 may be multiplied by the transmit signal scaling factor transferred in a previous device to adjust transmit signal power.

(3-2) Instead of directly multiplying the output of the QAM modulator 146-2 by the transmit signal scaling factor, a method of adjusting transmit signal power has also the same effect irrespective of a physical processing location in such a manner that a block, i.e., the precoder 146-4 or the digital beamforming 146-6, which multiplies a factor for each antenna at a later time, multiplies the transmit signal scaling factor in advance.

After operation 703, the downlink transmit power control device 140 may transmit downlink data to a terminal, based on the determined downlink transmit power.

Methods based on the embodiments disclosed in the claims and/or specification of the disclosure may be implemented in hardware, software, or a combination of both.

When implemented in software, computer readable recording medium for storing one or more programs (i.e., software modules) may be provided. The one or more programs stored in the computer readable recording medium are configured for execution performed by one or more processors in the electronic device. The one or more programs include instructions for allowing the electronic device to execute the methods based on the embodiments disclosed in the claims and/or specification of the disclosure.

The program (i.e., the software module or software) may be stored in random access memory (RAM), non-volatile memory including flash memory, Read Only Memory (ROM), Electrically Erasable Programmable Read Only Memory (EEPROM), a magnetic disc storage device, a Compact Disc-ROM (CD-ROM), Digital Versatile Discs (DVDs) or other forms of optical storage devices, and a magnetic cassette. Alternatively, the program may be stored in memory configured in combination of all or some of these storage media. In addition, the configured memory may be plural in number.

Further, the program may be stored in an attachable storage device capable of accessing the electronic device through a communication network such as the Internet, an Intranet, a Local Area Network (LAN), a Wide LAN (WLAN), or a Storage Area Network (SAN) or a communication network configured by combining the networks. The storage device may have access to a device for performing an embodiment of the disclosure via an external port. In addition, an additional storage device on a communication network may have access to the device for performing the embodiment of the disclosure.

In the aforementioned specific embodiments of the disclosure, a component included in the disclosure is expressed in a singular or plural form according to the specific embodiment proposed herein. However, the singular or plural expression is selected properly for a situation proposed for the convenience of explanation, and thus the various embodiments of the disclosure are not limited to a single or a plurality of components. Therefore, a component expressed in a plural form may also be expressed in a singular form, or vice versa.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a base station in a wireless communication system, the method comprising:
- receiving, from a terminal, uplink data and uplink control information (UCI);
- determining a modulation coding scheme (MCS) and a multiple-input multiple-output (MIMO) layer count, based on the uplink data and the UCI;
- determining a size of a transport block for the terminal, based on the MCS and the MIMO layer count;
- decreasing the size of the transport block for a data packet, when a size of a downlink data packet is less than or equal to a size of a predetermined minimum allocation resource;
- determining a transmit signal scaling factor for decreasing transmit power of the data packet;
- determining the transmit power of the data packet, based on the transmit signal scaling factor; and
- transmitting, to the terminal, the data packet based on the determined transmit power.

2. The method of claim 1, wherein the decreasing of the size of the transport block for the data packet comprises:
- determining the size of the transport block to be greater than or equal to the size of the data packet and close to the size of the data packet by decreasing at least one of the MCS or the MIMO layer count.

3. The method of claim 2, wherein the determining of the transmit signal scaling factor comprises:
- determining the transmit signal scaling factor, based on the decreased MCS and the decreased MIMO layer count.

4. The method of claim 2, wherein the determining of the transmit signal scaling factor comprises:
- determining a first SINR based on the MCS and the MIMO layer count before decreasing at least one of the MCS or the MIMO layer count;
- determining a second SINR based on the decreased MCS and the decreased MIMO layer count;
- determining a downlink transmit power backoff value by applying the first SINR and the second SINR to a predetermined table; and
- determining the transmit signal scaling factor, based on the downlink transmit power backoff value.

5. The method of claim 4, wherein the determining of the transmit signal scaling factor, based on the downlink transmit power backoff value, comprises:
- determining the transmit signal scaling factor by linearly transforming the downlink transmit power backoff value and applying a square root.

6. The method of claim 1, wherein the decreasing of the size of the transport block for the data packet comprises:
- decreasing the MCS;
- comparing the size of the transport block based on the decreased MCS with the size of the data packet;
- decreasing the MIMO layer count; and
- comparing the size of the transport block based on the decreased MIMO layer count with the size of the data packet.

7. The method of claim 1, wherein the determining of the transmit power of the data packet, based on the transmit signal scaling factor, comprises:
- multiplying a downlink baseband transmit signal by the transmit signal scaling factor.

8. The method of claim 1, wherein the determining of the transmit power of the data packet, based on the transmit signal scaling factor, comprises:
- determining the transmit power of the data packet by multiplying a modulated output signal of the data packet by the transmit signal scaling factor, or by multiplying a per-antenna factor by the transmit signal scaling factor in precoding or digital beamforming of the data packet.

9. A base station in a wireless communication system, the base station comprising:
- a transceiver;
- a processor; and
- memory storing instructions that, when executed by the processor, cause the base station to:
  - receive, from a terminal, uplink data and uplink control information (UCI),
  - determine a modulation coding scheme (MCS) and a multiple-input multiple-output (MIMO) layer count, based on the uplink data and the UCI,
  - determine a size of a transport block for the terminal, based on the MCS and the MIMO layer count,
  - decrease the size of the transport block for a data packet when a size of a downlink data packet is less than or equal to a size of a predetermined minimum allocation resource,
  - determine a transmit signal scaling factor for decreasing transmit power of the data packet,
  - determine the transmit power of the data packet, based on the transmit signal scaling factor, and
  - transmit, to the terminal, the data packet based on the determined transmit power.

10. The base station of claim 9, wherein, in order to decrease the size of the transport block for the data packet, the instructions that, when executed by the processor, cause the base station to determine the size of the transport block to be greater than or equal to the size of the data packet and close to the size of the data packet by decreasing at least one of the MCS or the MIMO layer count.

11. The base station of claim 10, wherein, in order to determine the transmit signal scaling factor, the instructions that, when executed by the processor, cause the base station to:
- determine the transmit signal scaling factor, based on the decreased MCS and the decreased MIMO layer count.

12. The base station of claim 10, wherein, in order to determine the transmit signal scaling factor, the instructions that, when executed by the processor, cause the base station to:
- determine a first SINR based on the MCS and the MIMO layer count for a case before decreasing at least one of the MCS or the MIMO layer count,
- determine a second SINR based on the decreased MCS and the decreased MIMO layer count,
- determine a downlink transmit power backoff value by applying the first SINR and the second SINR to a predetermined table, and
- determine the transmit signal scaling factor, based on the downlink transmit power backoff value.

13. The base station of claim 12, wherein, in order to determine the transmit signal scaling factor, based on the downlink transmit power backoff value, the instructions that, when executed by the processor, cause the base station to:

determine the transmit signal scaling factor by linearly transforming the downlink transmit power backoff value and applying a square root.

14. The base station of claim 9, wherein, in order to decrease the size of the transport block for the data packet, the instructions that, when executed by the processor, cause the base station to:

decrease the MCS, compare the size of the transport block based on the decreased MCS with the size of the data packet, decrease the MIMO layer count, and compare the size of the transport block based on the decreased MIMO layer count with the size of the data packet.

15. The base station of claim 9, wherein, in order to determine the transmit power of the data packet based on the transmit signal scaling factor, the instructions that, when executed by the processor, cause the base station to;

multiply a downlink baseband transmit signal by the transmit signal scaling factor.

16. The base station of claim 9, wherein, in order to determine the transmit power of the data packet, based on the transmit signal scaling factor, the instructions that, when executed by the processor, cause the base station to:

determine the transmit power of the data packet by multiplying a modulated output signal of the data packet by the transmit signal scaling factor, or by multiplying a per-antenna factor by the transmit signal scaling factor in precoding or digital beamforming of the data packet.

* * * * *